United States Patent [19]

Christian

[11] Patent Number: 5,219,133
[45] Date of Patent: Jun. 15, 1993

[54] LONE ATTACK AIRCRAFT DEFENSE SYSTEM

[76] Inventor: Allen B. Christian, 10561 Lakeside #N, Garden Grove, Calif. 92640

[21] Appl. No.: 863,031

[22] Filed: Apr. 3, 1992

[51] Int. Cl.$^5$ ............................ B64D 1/02; F41F 1/00
[52] U.S. Cl. ................................ 244/137.4; 89/1.815; 89/1.59
[58] Field of Search ............... 244/118.4, 137.1, 137.4; 89/1.815, 1.8, 1.51

[56] References Cited

U.S. PATENT DOCUMENTS

| | | | |
|---|---|---|---|
| 2,938,434 | 5/1960 | Myron | 89/1.815 |
| 2,958,260 | 11/1960 | Anderson | 89/1.815 |
| 3,018,692 | 1/1962 | Bilek | 89/1.815 |
| 4,307,650 | 12/1981 | Kuesters et al. | 89/1.815 |
| 5,050,477 | 9/1991 | Cowdery et al. | 89/1.815 |

Primary Examiner—Galen Barefoot
Attorney, Agent, or Firm—James D. Thackrey

[57] ABSTRACT

A defense system which provides turret-like platforms equipped with missiles at various points on an airplane or helicopter. The missiles are recoiless and may be either self-guided or aviator-guided. The number of missiles and type of launch (pylon or tube) provided are considered to be changeable according to the mission, but this invention only addresses the use of multiple rotatable platforms compatible with existing weaponry and technology.

1 Claim, 2 Drawing Sheets

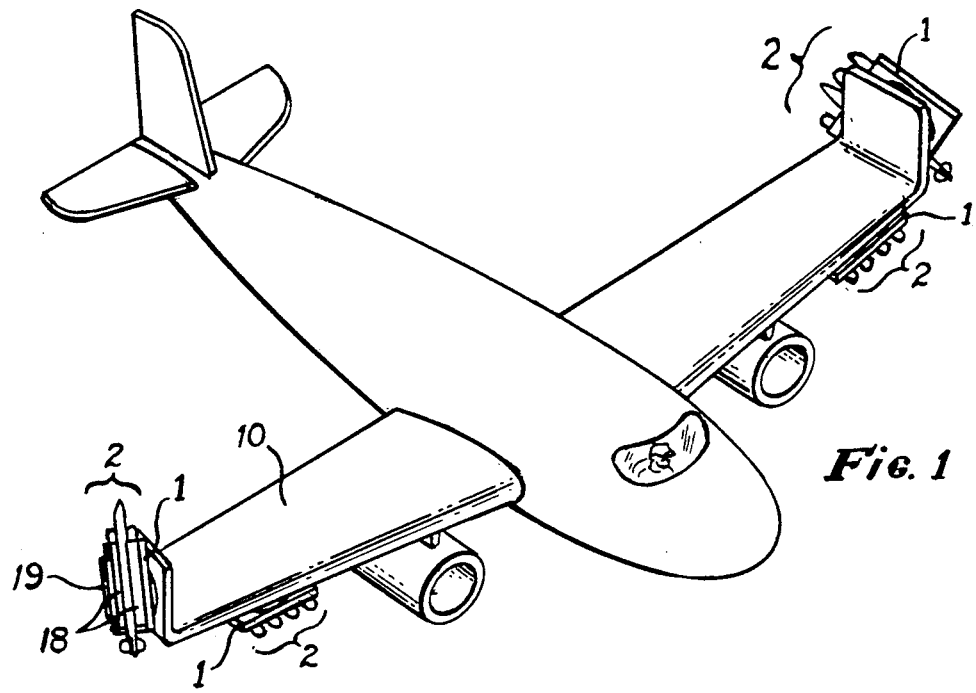
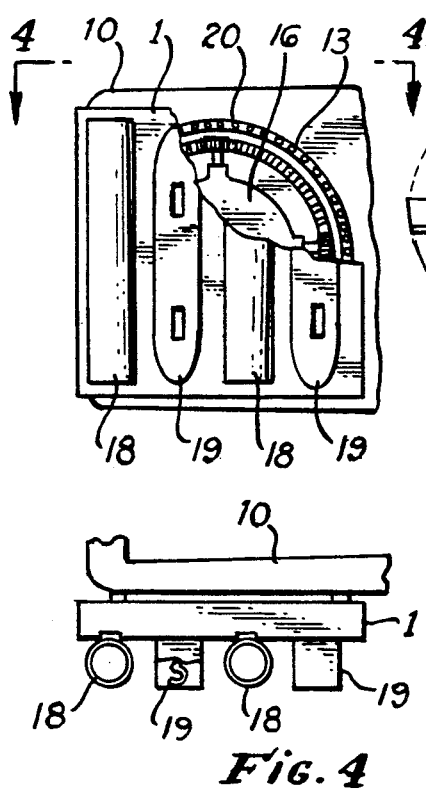
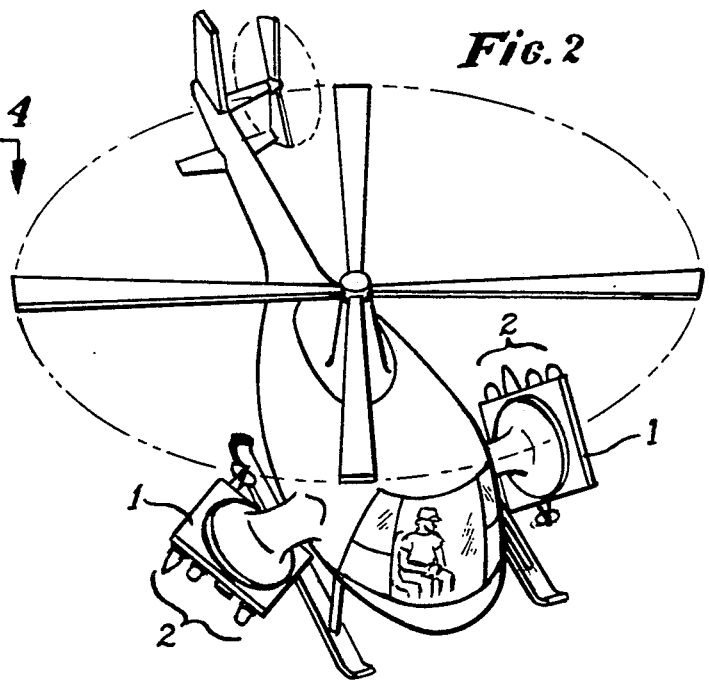
Fig. 1
Fig. 2
Fig. 3
Fig. 4

Fig. 5
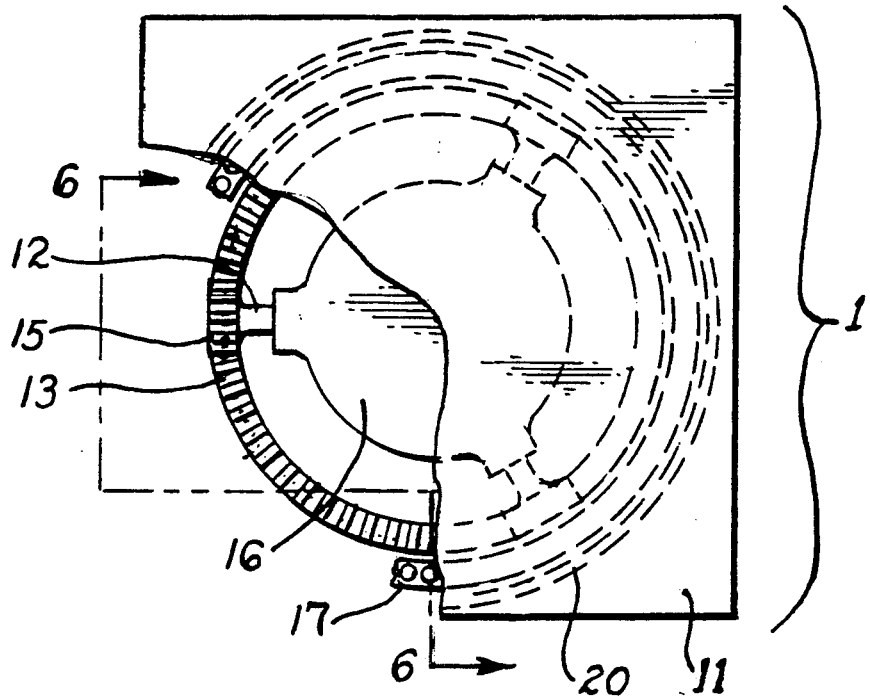
Fig. 6
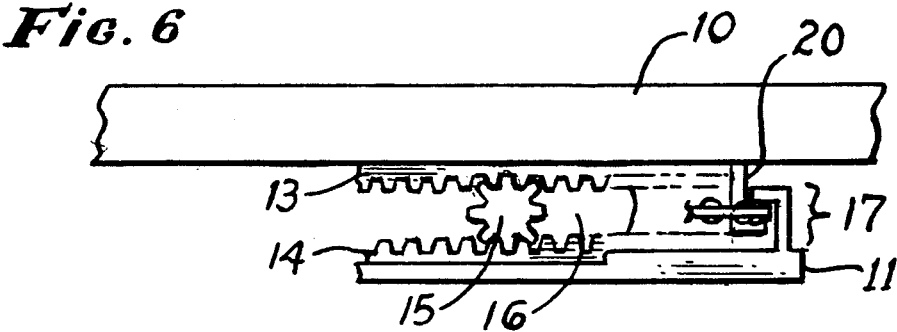
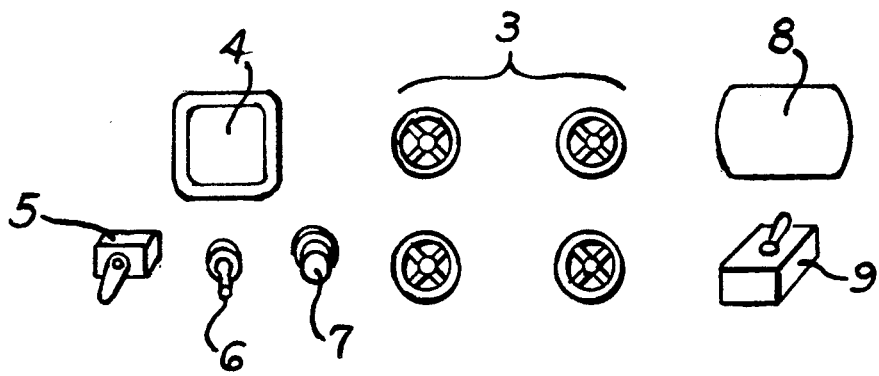
Fig. 7

LONE ATTACK AIRCRAFT DEFENSE SYSTEM

BACKGROUND OF THE INVENTION

1. Field of the Invention

This invention is in the field of military aircraft, primarily those designed for isolated combat with attacking enemy aircraft.

2. Description of Prior Art

Common practice in military missions to attack hostile installations is to send bombers or smaller attack aircraft to the target installation under the protection of fighter aircraft. The fighters create a zone of air superiority by attacking the attackers, within which the attack aircraft operates. All sorts of variations of this simple statement apply, from the enemy's use of ground-based weaponry to attackers use of Stealth (radar-invisible) bombers or unmanned cruise missiles flying a predetermined course. My invention adds a novel and useful special-purpose tool to this sort of warfare. Though primarily a system for thwarting attack by enemy aircraft on a lone airplane or helicopter, it may be adapted to be useful against missiles, whether fired from the ground or from distant launch means, airborne or shipborne. If it is within the state of the military art to convert my system into a reliable missile shield, it could also be handy for defense of a locality.

SUMMARY OF THE INVENTION

Basically, the system proposed herein is to mount a large number of recoiless missiles, self guided or aviator guided, on rotatable platforms at multiple points on the aircraft. The fact that the platforms are rotatable and large enough to contain several missiles each enables a member of the flight crew to point the missile, prior to its arming and launch, anywhere within the plane of the platform. The fact that the platforms are on a maneuverable aircraft, coupled with the variety of platforms to choose from, allows the plane of the platform to be adjusted so as to pass through the target or to lead it at any desired angle at the instant of launching. It is considered that present sensing, servomechanism, and computer technology will suffice to select an appropriate missile from the assortment aboard, to aim it properly at launch, and in cases where the missile requires it to guide the missile to the target.

An aircraft equipped with this system could defend itself against ground fire as well. Though the identification of target sites is not helped by the system, the potential for neutralizing them is increased. Moreover, the aircraft can still evade assault from the ground by changing course, speed, or altitude in the same manner as an aircraft not so equipped.

BRIEF DESCRIPTION OF THE DRAWINGS

FIG. 1 is a perspective view of a conventional airplane equipped with rotary platforms.

FIG. 2 is a perspective view of a helicopter equipped with rotary platforms.

FIG. 3 is a view looking upward into one of the horizontal rotary platforms of FIG. 1. There are no missiles in the launch structure in this figure.

FIG. 4 is a front view of the same platform as shown in FIG. 3.

FIG. 5 is a view looking upward at the platform of FIG. 3, without launch structure and partially cut away to expose some interior structure of the preferred embodiment rotary platform.

FIG. 6 is an elevation or side view of the platform shown in FIG. 5, cut away to expose detail.

FIG. 7 is one possible layout of the aviator's control console, taken from the aviator's position.

DETAILED DESCRIPTION

From the armament shown in FIGS. 1 and 2, one important feature of my system is clear: it can adapt readily to a variety of self-guided recoiless missiles. Merely a change of launch structure is required. The missiles known to the inventor to be capable of use on this system are four, Maverick, Phoenix, and Falcon being self guided and Tow being guided by its internal telemechanics while keeping its directing aviator informed of its position relative to the target by telemetry. Other missiles or specially developed missiles would obviously be usable by my system. Between the types of missiles, the various platform planes, and the easily varied attitudes the aircraft can reach temporarily, attack from any point in the sky can be met with a counter attack.

Item 1 in FIGS. 1 and 2 is the platform itself and Items 2 are the missiles. Two types of launch structure are shown in FIGS. 3 and 4, Item 18 being a tube and Item 19 being a pylon. The detailed structure of Items 18 and 19 vary with the missile 2 but are well within current art. The number and type of launch structure on any platform is conceived of as readily changed to suit the missiles armament chosen for each mission.

Rotary platform 1 in the preferred embodiment is shown in FIGS. 5 and 6. Item 16 contains the drive motor, which is hydraulic with electric motor backup in the preferred embodiment. Item 16 also contains the gearing required to drive three pinion shafts 12 and pinion gears 15. Pinion gears 15 taken together constitute a gear set. Obviously the number of pinions can be greater than three. The pinions engage both fixed ring gear 13 solidly attached to the wing structure, Item 10 of an airplane or to a protruding strut on a helicopter, and moveable ring gear 14 which is fixed to the base plate Item 11. The assembly of items 13, 14, and 15 is also referred to herein as "gears." As shown in FIGS. 5 and 6, a large diameter bearing Item 17 has its lower race fixed outside ring gear 13 to the wing structure through a tubular member 20. This is the preferred embodiment to allow the platform base plate 11 (and hence rotary platform 1) to rotate freely to any commanded position. Bearing 17 may be a thrust hearing only or an angular contact bearing. Upward load on platform 1 is preferably taken by a thrust bushing or bearing (not shown) incorporated into or attached to the drive and gear housing 16 to prevent excessively tight tolerances which would be required if bearing 17 also took this load. Other embodiments are well within the state of aircraft component design art.

FIG. 7 shows the information sources the aviator has which initiate or guide his action and the controls with which he executes the actions required of him by the defense system. Radar scope Item 4 displays all the craft in the sky and indicates their status as friend or foe. Computer/selector Item 5 acts as the command and control center. It gets input from and delivers output to all the platforms, launchers, and missiles, and signals the aviator that aiming instructions have been complied with prior to his arming and launch-firing. Arming and firing are controlled by the aviator using arm switch 6 and launch-fire button 7 respectively. Platform rotation wheels Item 3 are linked to angle sensors reporting actual platform angular position errors with respect to that commanded by platform rotation wheels 3, computer/selector Item 5 does not signal the aviator that aiming instructions have been complied with until the error is zero. Computer/selector Item 5 also switches to the backup electrical platform drive if errors cannot be zeroed using the hydraulic drive.

When missiles guided by telemetry are to be used (commanded through Item 5 by the aviator), Items 8 and 9 are used. Item 8 displays the missile-eye view of the target received by the aircraft from the missile telemetry. Item 9 is a joystick which converts the aviator's commands to telemetric signals which are sent to the missile's telemechanical components.

Various other arrangements of instruments, computers, aiming and firing controls for the aviator are within the state-of-the-art but not known in detail by the inventor. In particular, the technology of locking a launch system to a target, using radar, is known to be well developed. Therefore, the details shown in FIG. 7 and the above discussion can only be considered representative.

The positioning of rotary platforms on the aircraft is preferably one such that the plane in which missiles are launched does not intersect any part of the aircraft. If such positioning is inconvenient, it is preferred that positive mechanical stops (not shown) to platform rotation angle be incorporated. Failing that, software stops in the controls are possible. In any case, some attention in the design stage of aircraft using this system needs to be imposed because of the deadly potential of the recoiless guided missiles 2. In FIG. 2 this is accomplished by limiting the tilt from vertical of the planes containing rotary platforms 1 to at least that which will miss the rotor blade arc. Some tilt is desired in order to enhance the defense system's ability to respond quickly to attack from above.

The vertical winglets shown in FIG. 1 as part of wing 10 provide convenient locations for 360 degree rotary platforms. Such winglets have aerodynamic usefulness in aiding lift when the aircraft is steeply banked for turning.

The invention having been described in its preferred embodiment, it is clear that modifications are within the capacity of those skilled in the art without exercise of the inventive faculty. Accordingly, the scope of this invention shall be defined in the scope of the following claims:

I claim:

1. Apparatus for defensive armament of military aircraft of the type which can alone control the airspace in their vicinity and conduct lone sorties, said apparatus comprising the combination of:

rotary platforms on the exposed surface of which an assortment of recoiless missiles of different capabilities are mounted in launching means, said rotary platforms being mounted to the aircraft structure at multiple points, and a first ring gear and a bearing on that surface of each said platform which faces the aircraft, said bearing being of larger diameter than said first ring gear and said first ring gear being of a diameter sufficient to surround drive means comprising a set of pinion gears engaging said first ring gear, and a hydraulic platform drive backed up by an electric platform drive, said hydraulic platform drive being used normally and said electric platform drive being used to rotate each of said set of pinion gears only when said hydraulic platform drive is disabled, and a second ring gear fixed to the aircraft, of the same size as said first ring gear and engaging said set of pinion gears, and mounting means for said bearing fixed to the aircraft at points diametrically larger than said first or second ring gear, and a plurality of radar scopes displaying all the aircraft in the sky and indicating their status as friend of foe, and a computer/selector issuing commands required to rotate one of rotary platforms to aim an aviator-selected missile at an aviator-selected target and signaling the aviator when aiming instructions have been complied with, and arming and firing controls for the selected missile.

* * * * *